July 3, 1956

W. LYSLES 2,752,910

EXTENSION OVEN

Filed Nov. 12, 1952

INVENTOR.
WILLIAM LYSLES.
BY
Robert A. Sloman
ATTORNEY.

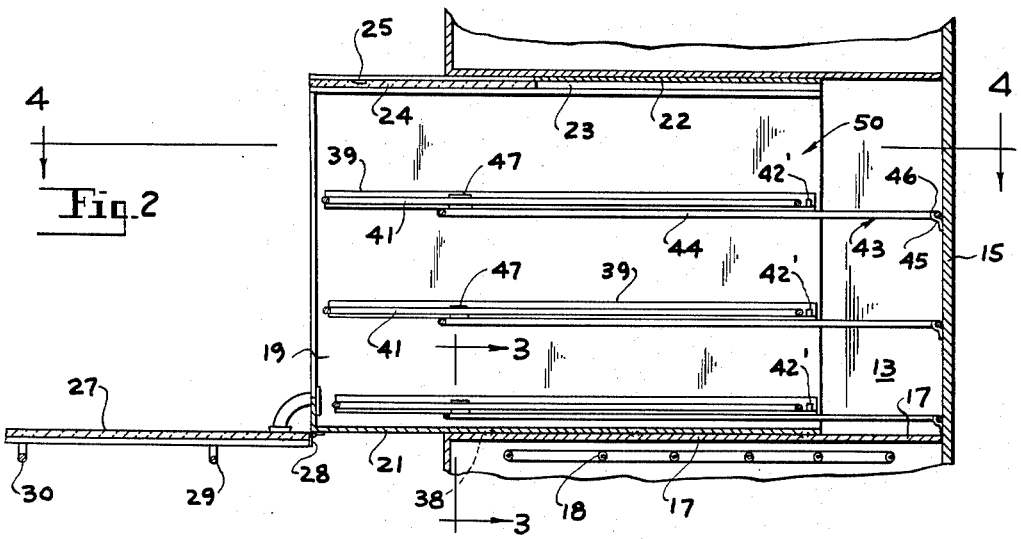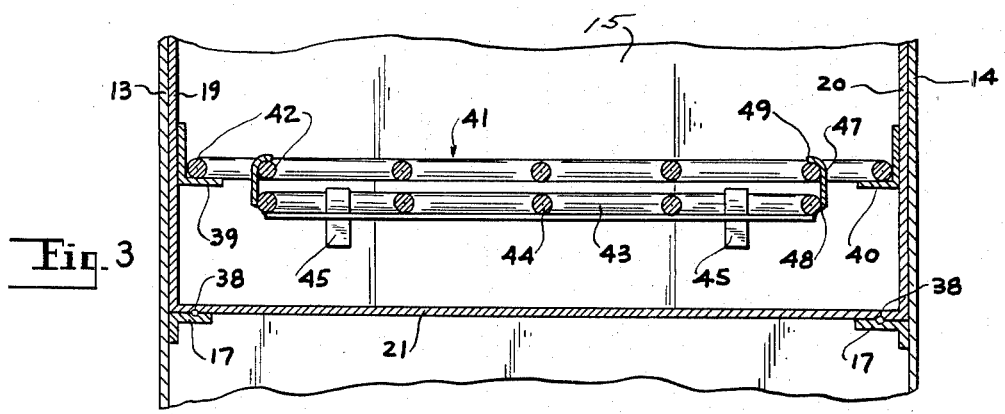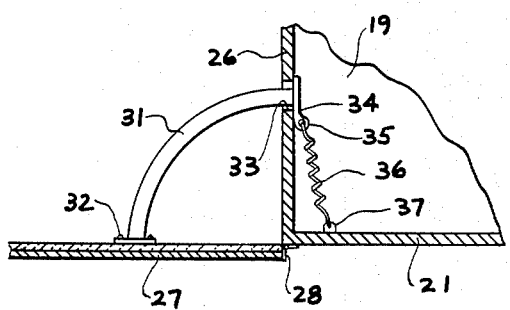

United States Patent Office 2,752,910
Patented July 3, 1956

2,752,910

EXTENSION OVEN

William Lysles, Detroit, Mich., assignor of twenty per cent to William V. Banks, Detroit, Mich.

Application November 12, 1952, Serial No. 320,085

4 Claims. (Cl. 126—19)

This invention relates to stoves, and more particularly to ovens and oven extensions for stoves.

Heretofore, the present oven may have had a limited volumetric capacity for a particular size of oven which prevented the baking of multiple dishes at one time, or on the other hand, was not of sufficient length as to accommodate larger size roasts and fowl, such as turkeys. It is the object of the present invention to provide a drawer or slide extension for the oven, whereby the same can be elongated as desired.

It is the further object of this invention to provide a drawer as an extension for the oven which is adapted for sliding in and out movements, and which may be manufactured as initial equipment for an oven, or as an attachment to an existing oven.

It is the further object of this invention to provide a novel oven extension drawer which has a sliding transparent top wall portion permitting access to the extension oven without opening the door to said extension oven.

It is the further object of this invention to provide a hinged door upon the outer end of the oven extension which may be opened, as and when desired for access to the interior of the oven whether in its conventional condition, or when extended.

It is the further object of this invention to provide an extension grill structure within the oven extension, whereby the grill will be elongated upon the manual outward sliding movement of the extension oven.

These and other objects will be seen from the following specification and claims in conjunction with the appended drawings in which:

Fig. 2 is a fragmentary section taken on line 2—2 of Fig. 1.

Fig. 3 is a fragmentary section taken on line 3—3 of Fig. 2, on an enlarged scale.

Fig. 5 is a fragmentary elevational section illustrating the mounting of the door to the extension oven.

Figure 1:
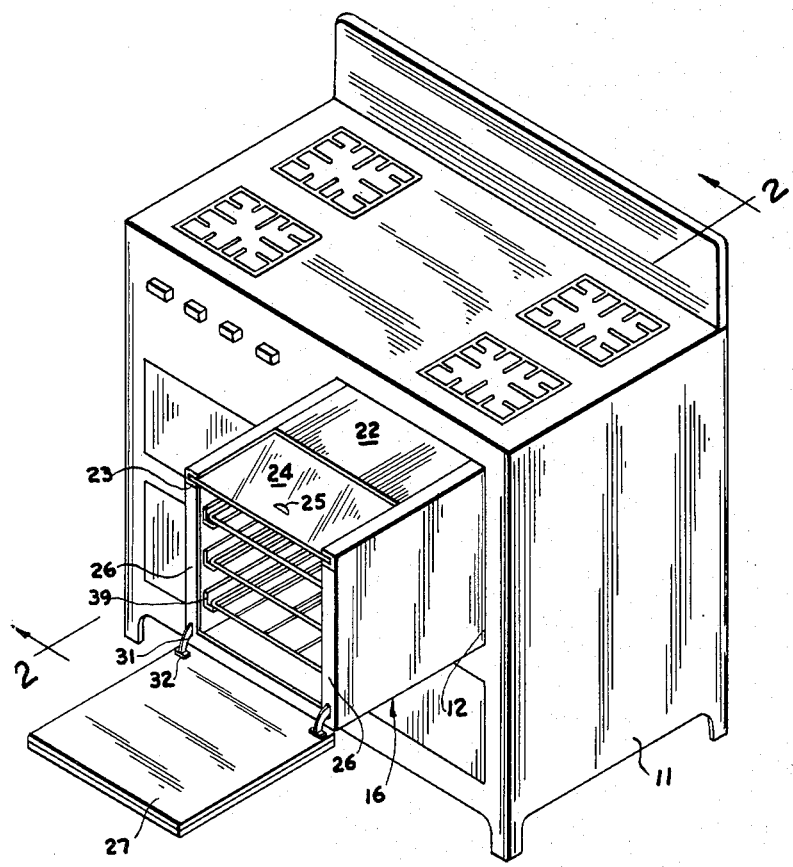
Fig. 1 is a perspective view of a stove illustrating the outward positioning of an extension oven therefor.

It will be understood that the above drawings illustrate merely one preferred embodiment of the invention, and that other embodiments are contemplated within the scope of the claims hereafter set forth.

Referring to the drawings, a conventional stove is generally indicated at 11, and provided with a rectangular opening 12 in its front wall within which is slidably positioned the present oven extension 16.

Figure 4:
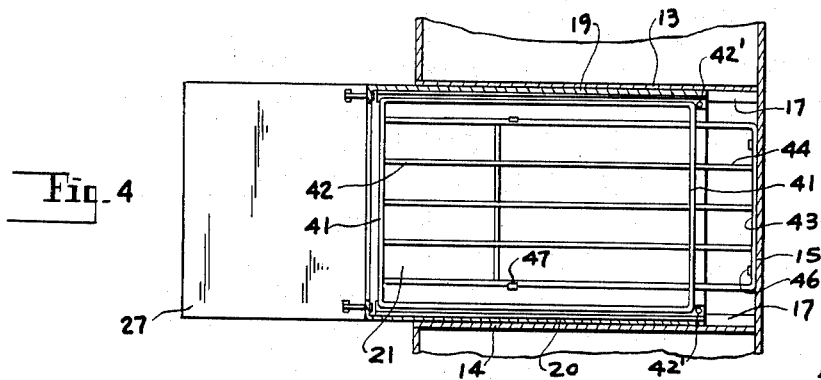
Fig. 4 is a fragmentary section taken on line 4—4 of Fig. 2.

The interior of the stove includes the upright bounding side walls 13 and 14 for the oven, as well as, the rear wall 15, as shown in Figs. 2, 3 and 4, together with the lower open portion of the oven within which are a plurality of burner or heating elements 18, Fig. 2.

The oven extension, generally indicated at 16, is slidably positioned through the rectangular opening 12 in the front wall of the oven and is adapted for in and out supported movement upon the side supports 17 which project inwardly from the oven walls 13 and 14, in the manner shown in Fig. 4.

The oven extension includes the spaced upright side walls 19 and 20 and the interconnecting flat bottom wall 21, together with partial top wall 22 which extends from the rear portion of the oven extension, but is spaced from the front end thereof, as shown in Figs. 1 and 2.

Adjacent the upper interior portions of oven extension 16, are a pair of inwardly directed opposed channels 23 adapted to slidably receive the transparent door element 24, which may be made of any desired transparent substance, such as glass or plastic, to permit visual access to the interior of the oven extension without opening of said door element 24. Said door element has formed in its upper surface a suitable indentation 25 to permit manual sliding opening and closing movements of the horizontal door element 24.

The oven extension 16 has a pair of spaced front wall elements or pintles 26 against which the oven door 27 is adapted to cooperatively register.

The door 27 is hinged as at 28 to the bottom wall portion 21 of said oven extension. Arcuate stops 31 are anchored at 32 to interior portions of the oven door 27 and are adapted for sliding opening and closing movements within the upright slots 33 formed in the front wall elements 26, as illustrated in Figs. 1 and 5.

Transverse stops 34 are arranged adjacent the inner surface of the front wall elements 26 and are secured to the inner ends of the door stops 31 for limiting the outward opening movements of said door.

Coiled springs 36 are joined at their one ends at 35 to the door stops 34 and at their other ends are anchored as at 37 to the bottom wall 21 of the oven extension 16.

As shown in Fig. 2, there are provided, preferably, a plurality of friction minimizing elements, such as the small rollers 38, which are suitably imbedded and loosely retained within the undersurface of the bottom wall 21 and are adapted for cooperative supported engagement upon the support ledges 17 shown in Fig. 4. It is contemplated that small roller wheels or the equivalent could be used for this purpose to facilitate the sliding opening and closing movements of the oven extension 16.

Provision is made upon the interior of the extension oven 16 for a plurality of wire grates 41 of a conventional construction, which are supported along their opposite longitudinal sides upon the opposed angle irons 39 and 40 secured in spaced relation upon opposite interior wall portions of the extension oven 16, in the manner illustrated in Figs. 1, 3 and 4.

As illustrated in Fig. 3, the outer elongated wire elements 42 are supported upon the angle irons 39 and 40, and it will be noted that there are slightly raised buttons 42' formed in the upper surfaces of the ledges 17 adjacent their inner ends which locate the grills 41 in position, and guarantee that the grills will move longitudinally upon corresponding sliding movements of the oven extension.

It will be noted that the oven extension 16 is open at 50 at its inner end to provide hot air communication from the oven body proper to the interior of the oven extension 16. Furthermore, the bottom and side walls of said oven extension, being metallic are also good conductors of heat.

Upon opening movement of the oven extension 16 to the desired position, it is necessary to provide for an extension of the food supporting grills. For this purpose there are provided a plurality of horizontally arranged extension grills 43 with elongated bars 44, which are arranged slightly below a corresponding drawer grill 41, to thereby provide an extension therefore as the drawer or oven extension is opened.

Clips 45 are secured in horizontally spaced relation upon the interior surface of the oven wall 15 and have outward and upward extension 46, which retainingly extend around a portion of the grill 43 for immovably securing the same and for supporting the rear end thereof. There is an extension grill 43 for each of the horizontally arranged drawer grills 41. The respective front ends of each of the extension grills 43 are arranged directly under the corresponding drawer grill 41 and are slidably supported and suspended therefrom by the opposed upright clips 47, as shown in Fig. 3.

The lower ends of the clips 47 are secured to the extension grill 43 adjacent its front end as by the welds 48. The upper portions of the clips 47 are curved inwardly as at 49 and extend over the corresponding rods 42 of the grill 41, slidably engaging the same. Consequently, upon outward movement of the drawer 16, the extension grills 43 are slidably supported by the outwardly moving drawer grills 41 respectively. This means that for all outward positions of adjustment of the oven extension, there will be an adequate supporting grill consisting of the drawer grill 41 and the adjacent under-lapped extension grill 43.

Inasmuch as the drawer grills 41 are loosely supported upon the corresponding angle irons 39 and 40 within the drawer 16, it is contemplated that any or all of said grills may be manually removed. It is apparent from Fig. 2 that the corresponding extension grills 43 will be disengaged from their supporting and retaining clips 45 by a slight upward adjustment of the rear ends of said extension grills. Thus the grill 41 and its extension 43 will be removed as a unit.

It may be desired to remove only the top two grills and their extensions, as where a turkey or other large object is to be roasted within the extension oven.

There may be many situations where due to the small size of the object or objects to be cooked, that it will be unnecessary to outwardly open the extension oven 16. In that case, access to the interior of the drawer or oven extension 16 may be obtained merely by outward opening of the drawer door 27 about its hinge 28 using the upper handle 30.

When it is desired to use the extension oven to increase the volumetric capacity of the oven cavity, the extension oven 16 or drawer, may be manually slid outwardly to the desired extent by using the lower handle 29 on the door 27.

For the cooking operation, the extension drawer will remain in the outwardly adjusted position.

For inspection or access to the cooked article in many situations, it will not be necessary to further open the door 27 inasmuch as the cover element 24 of said drawer may be manually slid rearwardly, as desired.

Having described my invention, reference should now be had to the claims which follow for determining the scope thereof.

I claim:

1. In a stove having an oven cavity, opening in the front wall of said stove, an extension oven comprising a hollow covered drawer open at its rear end entirely positioned within said cavity and slidably mounted upon said stove, adapted for outward movement to increase the volumetric capacity of said oven cavity, said drawer having a stationary cover throughout its rear portion forming a part thereof, opposed inwardly directed horizontal channels upon the interior side walls of said drawer at its top, and a horizontally slidable transparent cover at the front portion of said drawer slidably mounted within said channels.

2. The stove of claim 1, an upright door normally aligned with said front wall and horizontally hinged at its bottom edge to the front end of said drawer, and a pair of vertically spaced handles on said door, the lower thereof being adjacent said door hinge and adapted to open said drawer, and the upper thereof adapted to open said door.

3. In a stove having an oven cavity, opening in the front wall of said stove, an extension oven comprising a hollow covered drawer open at its rear end entirely positioned within said cavity and slidably mounted upon said stove, adapted for outward movement to increase the volumetric capacity of said oven cavity, a stationary cover throughout the rear portion of said drawer and forming a part thereof, horizontally disposed oppositely arranged guides upon the interior side walls of said drawer forwardly of and substantially coplanar with said stationary cover, and a horizontally reciprocal transparent cover at the front portion of the drawer slidably supported at its edges within said guides.

4. The stove of claim 1, opposed elongated horizontally disposed ledges mounted upon the interior side walls of said drawer, stops on the inner ends of said ledges, a horizontal grill within said drawer mounted on said ledges engaging said stops and movable therewith, opposed upstanding clips mounted upon the inner end wall of the stove defining said cavity, and a horizontal extension grill substantially aligned with said first grill retainingly supported at its rear ends upon and over said clips and slidably supported and depending at its front end from said first grill whereby an opening withdrawing movement of said drawer will effect a corresponding simultaneous relative movement between said grills.

References Cited in the file of this patent

UNITED STATES PATENTS

| | | |
|---|---|---|
| 1,345,824 | Bayless | July 6, 1920 |
| 1,827,027 | Maeder | Oct. 13, 1931 |
| 1,889,218 | Reedy | Nov. 29, 1932 |
| 1,925,371 | Charter | Sept. 5, 1933 |
| 1,934,125 | Hurt | Nov. 7, 1933 |
| 2,378,421 | McCormick | June 19, 1945 |
| 2,605,759 | Phares | Aug. 5, 1952 |
| 2,645,359 | Jewell | July 14, 1953 |

FOREIGN PATENTS

| | | |
|---|---|---|
| 15,983 | Great Britain | Dec. 7, 1886 |
| 32,267 | Norway | May 2, 1921 |
| 145,922 | Australia | May 25, 1936 |